(12) United States Patent
Zhang et al.

(10) Patent No.: US 7,400,497 B2
(45) Date of Patent: Jul. 15, 2008

(54) PORTABLE COMPUTER

(75) Inventors: Jie Zhang, Shenzhen (CN); Chien-Li Tsai, Shenzhen (CN); Hsuan-Chen Chen, Shenzhen (CN); Ke-Cheng Lin, Shenzhen (CN); Wen-Kang Lo, Shenzhen (CN); Zhi-Gang Liu, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 167 days.

(21) Appl. No.: 11/308,185

(22) Filed: Mar. 10, 2006

(65) Prior Publication Data

US 2006/0268503 A1 Nov. 30, 2006

(30) Foreign Application Priority Data

May 29, 2005 (CN) .................... 2005 2 0059313 U (51) Int. Cl.
*H05K 5/03* (2006.01)
(52) U.S. Cl. .................... 361/683; 361/681; 312/223.2
(58) Field of Classification Search ................ 361/681, 361/683; 312/223.1
See application file for complete search history.

(56) References Cited

U.S. PATENT DOCUMENTS

| | | | | |
|---|---|---|---|---|
| 5,583,529 | A * | 12/1996 | Satou ......................... | 345/87 |
| 6,317,315 | B1 * | 11/2001 | Lee et al. .................... | 361/681 |
| 2005/0206799 | A1 * | 9/2005 | Li et al. ....................... | 349/58 |

FOREIGN PATENT DOCUMENTS

TW 523651 3/2003

* cited by examiner

*Primary Examiner*—Jayprakash N Gandhi
*Assistant Examiner*—Ingrid Wright
(74) *Attorney, Agent, or Firm*—Winston Hsu (57) ABSTRACT

A portable computer includes a base unit (1) and a cover unit (2). The cover unit includes a framework (30), a pair of positioning members (50), a Liquid Crystal Display (LCD) panel (70) and a cover (90). The positioning members are attached to the framework. The LCD panel is received in the space made of the framework and the positioning members. The cover engages to the framework.

18 Claims, 7 Drawing Sheets

PORTABLE COMPUTER

FIELD OF THE INVENTION

The present invention relates to a portable computer, and more particularly to a portable computer which includes a cover and a Liquid Crystal Display (LCD) panel replaced expediently.

DESCRIPTION OF RELATED ART

Portable computers, such as laptop computers and notebook computers, have become increasingly popular for general use. Some users assemble portable computers by themselves, thus the components and modules of portable computers need to be replaced easily.

Figure 7:
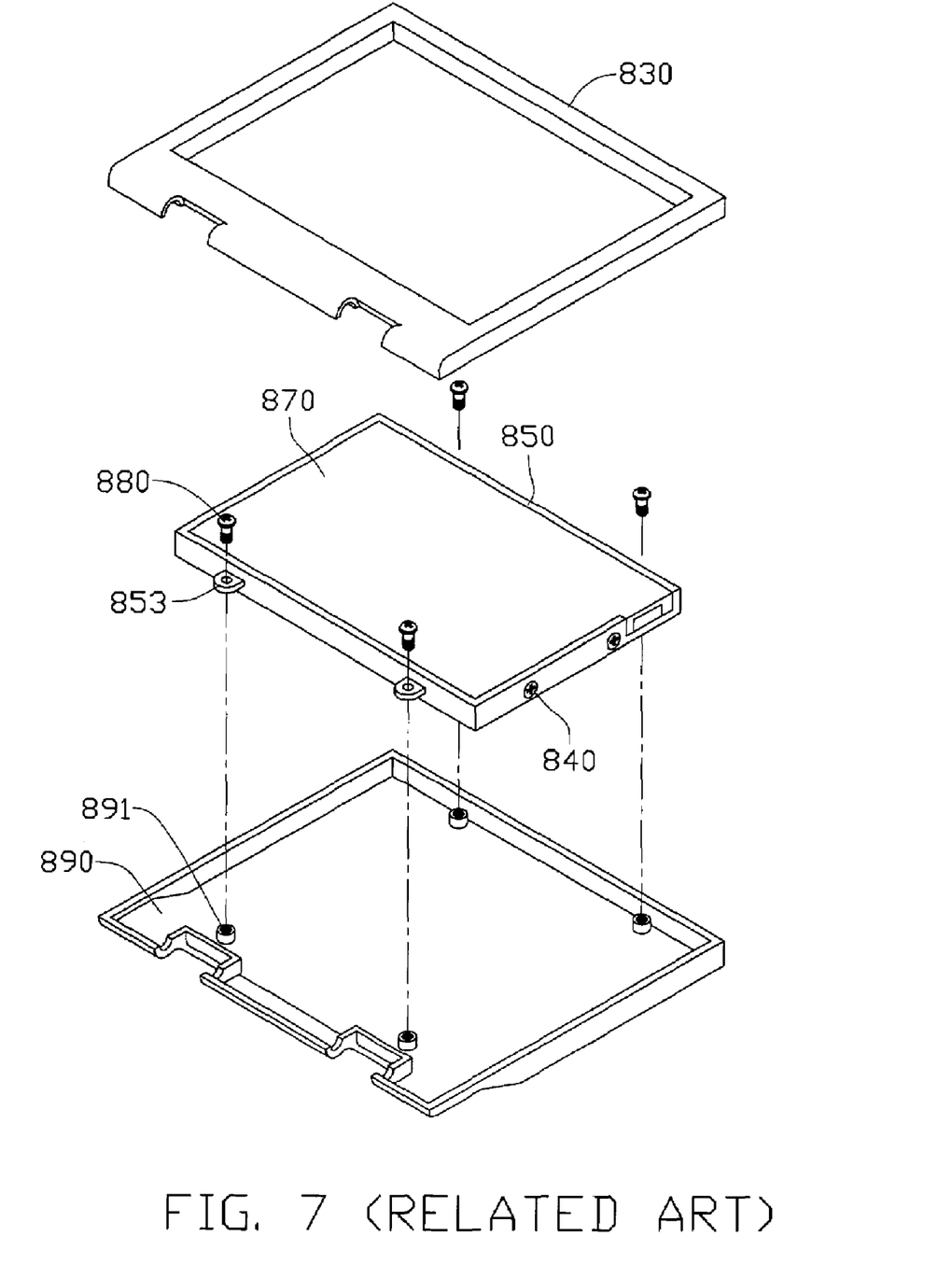
FIG. 7 is an exploded, isometric view of a conventional cover unit of a portable computer.

Generally, the enclosure of a portable computer is made of plastics, in order to protect the LCD panel and strengthen the cover unit of the portable computer, the LCD panel is attached to a frame, and then the frame engages to the enclosure of the portable computer. As shown in FIG. 7, the cover unit of the portable computer includes a framework 830 and a cover 890. An LCD panel 870 is received in a frame 850 by a plurality of screws screwing. A plurality of retaining tabs 853 with through holes protrudes from two side panels of the frame 850. A plurality of protruding posts 891 with threaded holes is formed at the internal surface of the cover 890 corresponding to the retaining tabs 853 respectively. A plurality of screws 880 extends through the through holes of the retaining tabs 853 and then engages in the threaded holes of the protruding posts 891 respectively, thus the frame 850 is attached to the cover 890. The framework 830 engages to the cover 890. However, to replace the LCD panel 870, a user has to take out the framework 830 and unscrew the frame 850 from the cover 890, and then separate the LCD panel 870 from the frame 850. Moreover, to replace the cover 890 for aesthetic feeling, a user has to take out the framework 830 and unscrew the frame 850 to separate the cover 890, too. The process inconveniences the user and the LCD panel 870 takes a risk of being damaged.

What is desired, therefore, is a portable computer which includes a cover and an LCD panel replaced expediently.

SUMMARY OF INVENTION

In one preferred embodiment, a portable computer includes a base unit and a cover unit. The cover unit includes a framework, a pair of positioning members, an LCD panel and a cover. The positioning members are attached to the framework. The LCD panel is received in the space made of the framework and the positioning members. The cover detachably engages to the framework.

The positioning members and the LCD panel engage to the framework, thus the cover is taken out to be replaced directly. To replace the LCD panel, the cover is taken out, and then the LCD panel is separated from the framework of the cover unit freely.

Other advantages and novel features will become more apparent from the following detailed description of preferred embodiments when taken in conjunction with the accompanying drawings, in which:

DETAILED DESCRIPTION

Figure 1:
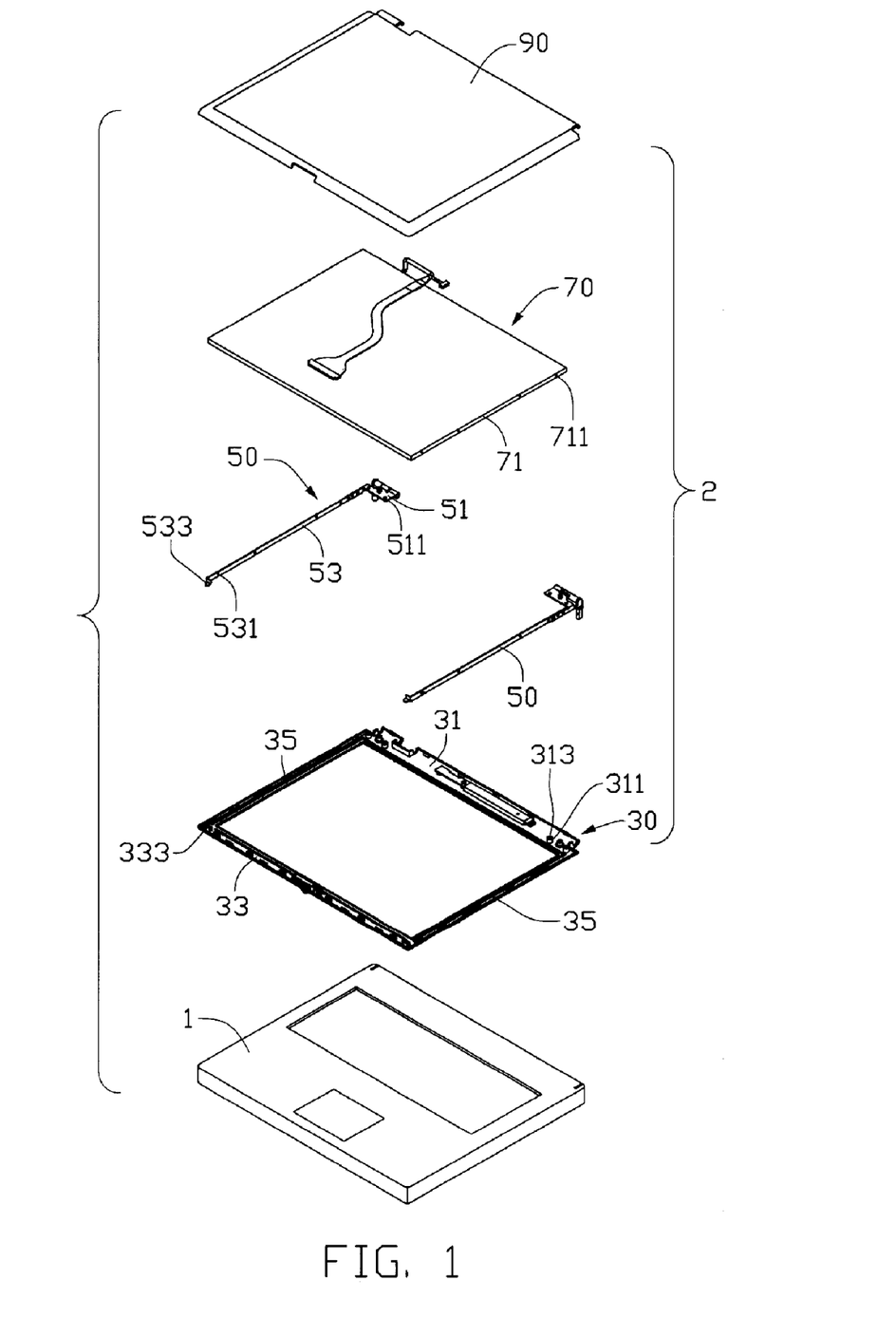
FIG. 1 is an exploded, isometric view of a portable computer with a cover unit and a pair of positioning members in accordance with a preferred embodiment of the present invention.
Figure 2:
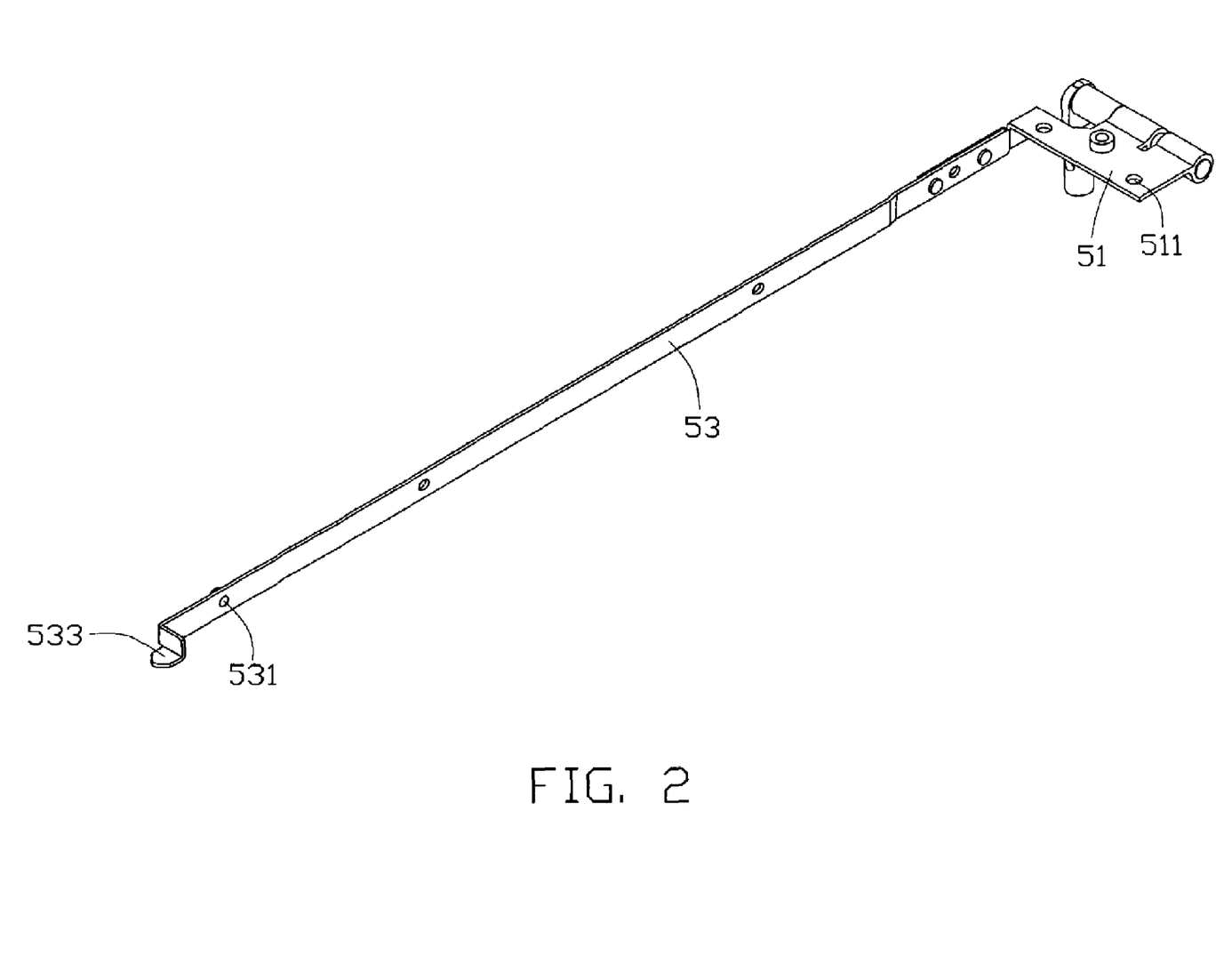
FIG. 2 is an enlarged view of the positioning member.

Referring to FIGS. 1 and 2, a portable computer in accordance with a preferred embodiment of the present invention includes a base unit 1, and a cover unit 2 pivotally connected to a rear portion of the base unit 1. The cover unit 2 includes a framework 30, a pair of L-shaped positioning members 50 attached to the framework 30, and a cover 90 engaging to the framework 30. An LCD panel 70 is received in the cover unit 2.

The framework 30 is a rectangular frame with four sides and an opening enclosed by the four sides. The four sides include a first long side 31, a second long side 33, and a pair of short sides 35. A plurality of protruding posts 311 is formed from the first long side 31 of the framework 30 at an inner surface thereof. Each protruding post 311 forms a first threaded hole 313. Each end of the second long side 33 of the framework 30 forms a locking bridge 333 at the inner surface of the framework 30.

The positioning members 50 are assembled on the short sides 35 of the framework 30 respectively. Each positioning member 50 includes a positioning tab 51 and a main body 53. A plurality of first through holes 511 is defined in the positioning tab 51 corresponding to the protruding posts 311 of the framework 30. A plurality of second through holes 531 is defined in the main body 53 of the positioning member 50. A positioning pin 533 protrudes from an end of the main body 53 of the positioning member 50 corresponding to the locking bridge 333.

The LCD panel 70 includes two sides 71. A plurality of second threaded holes 711 is defined in the sides 71 of the LCD panel 70 corresponding to the second through holes 531.

Figure 3:
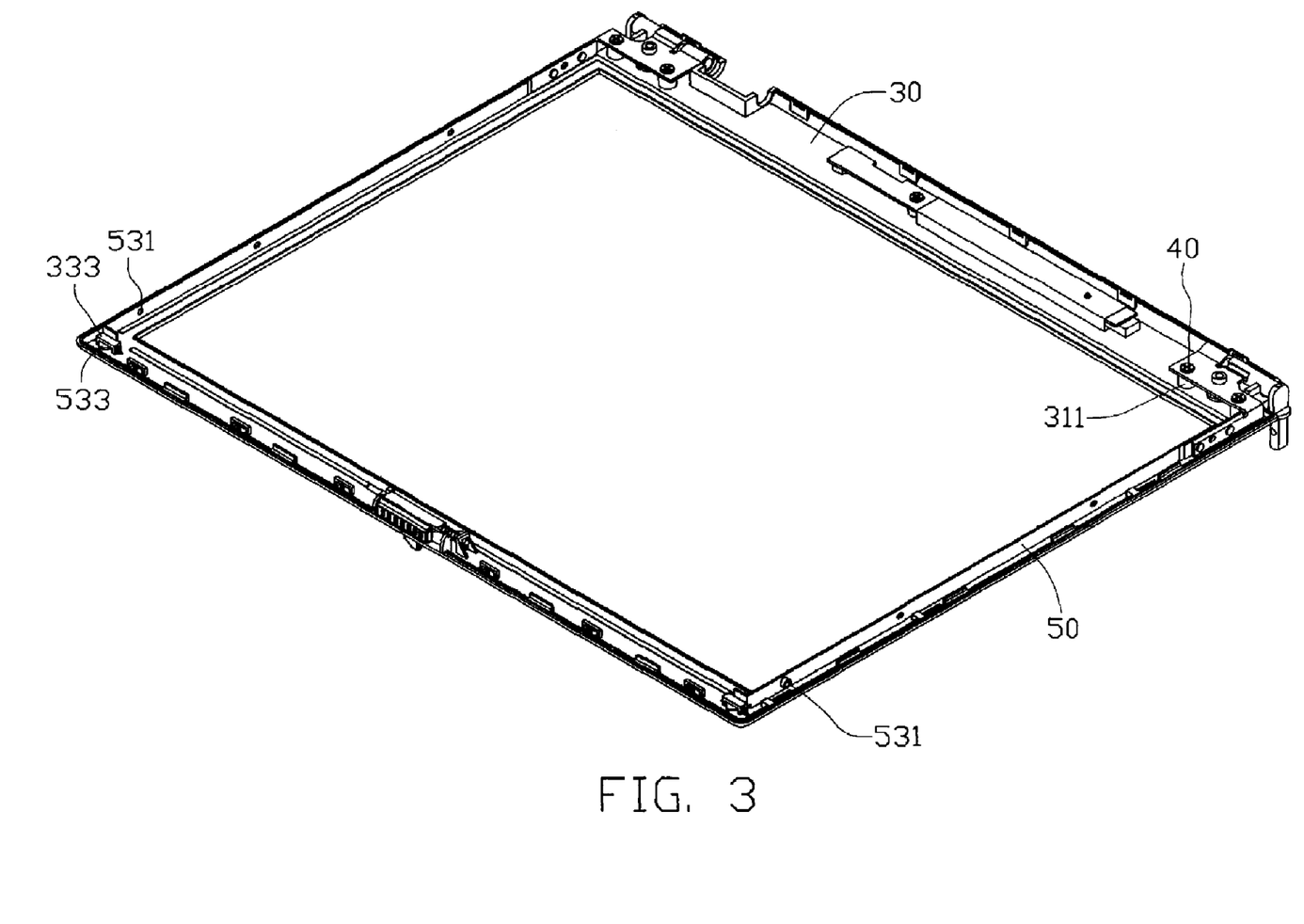
FIGS. 3 to 5 are isometric views showing the assembly process of the cover unit.
Figure 4:
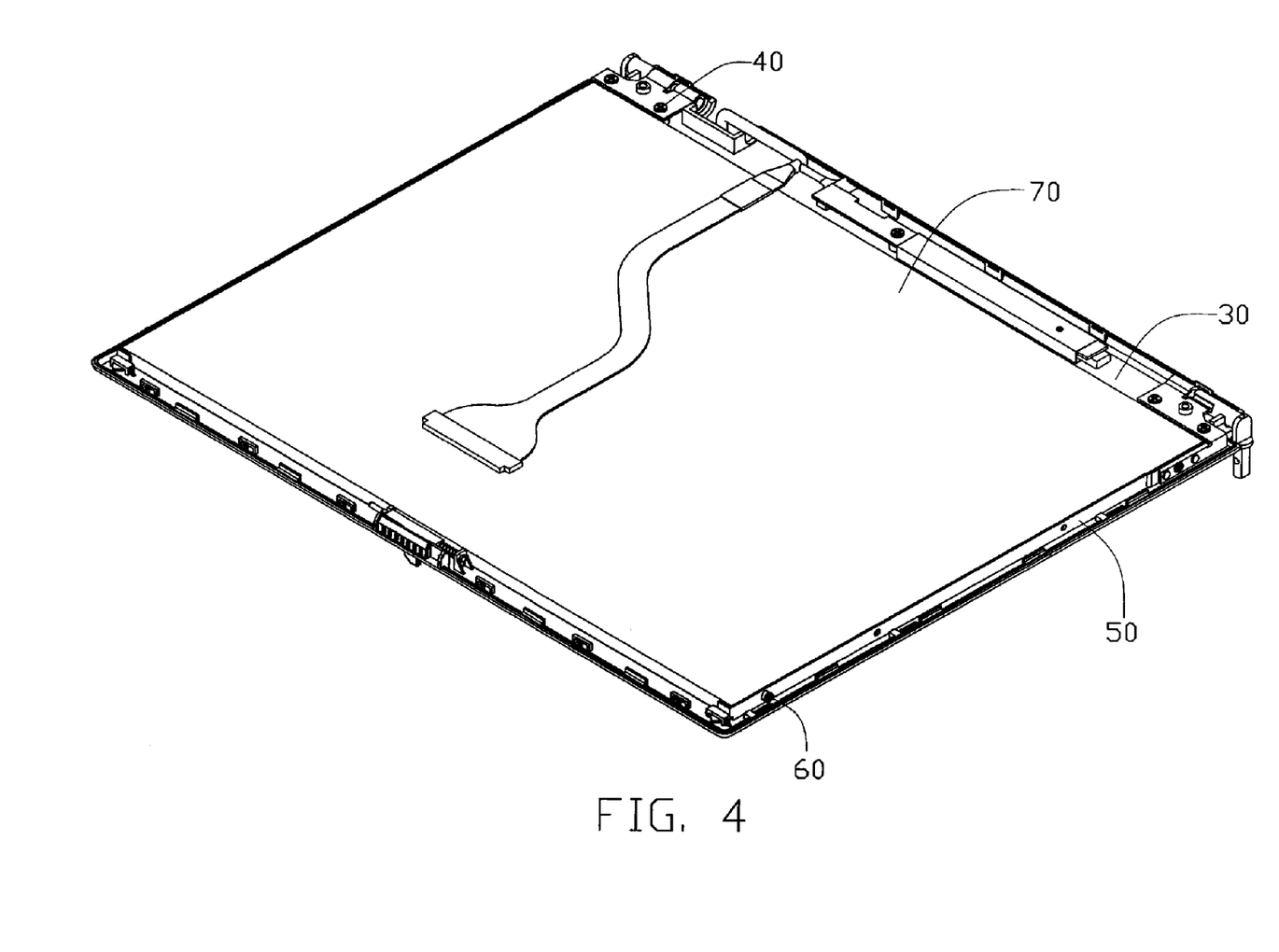
Figure 5:
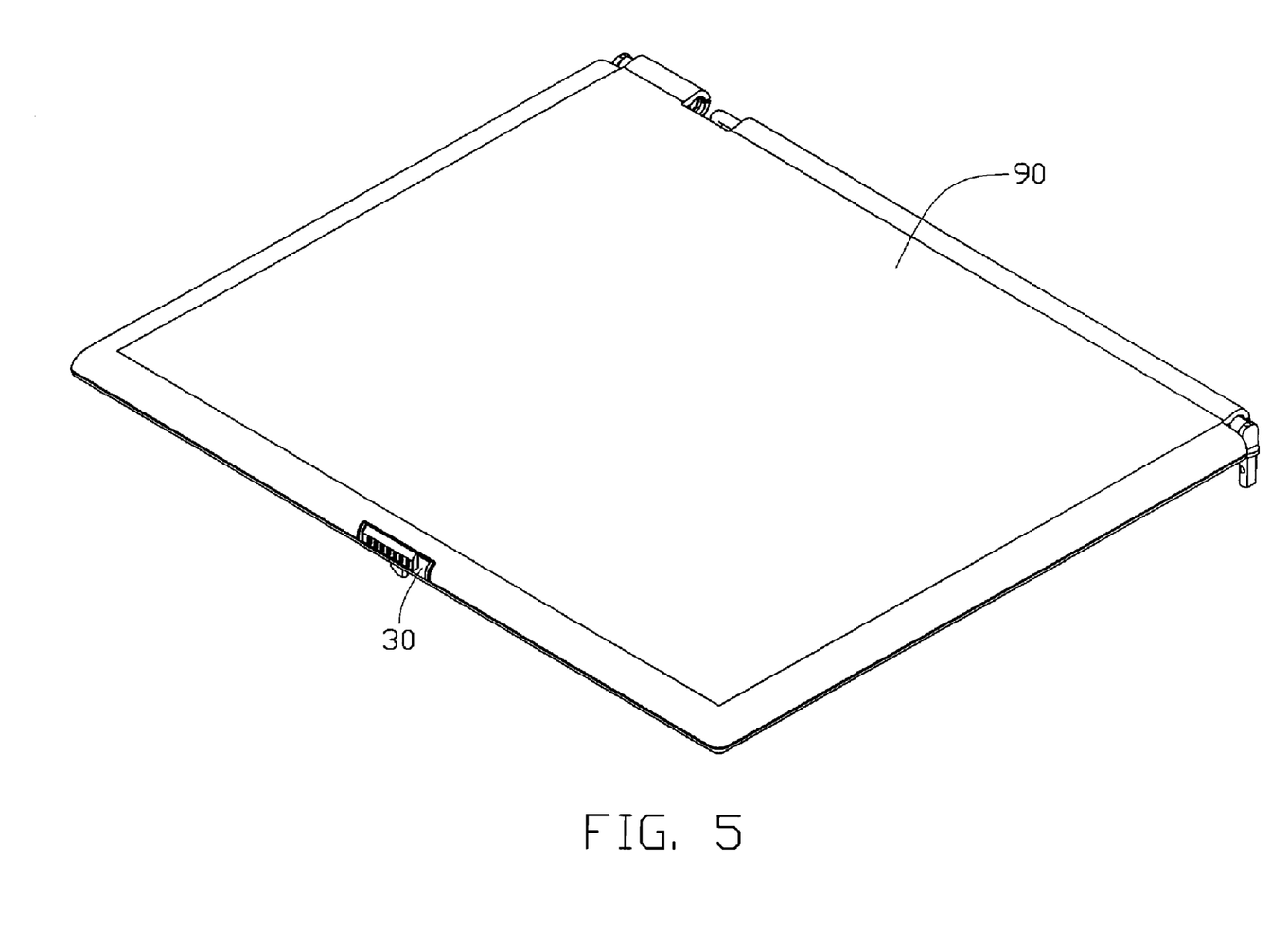
Figure 6:
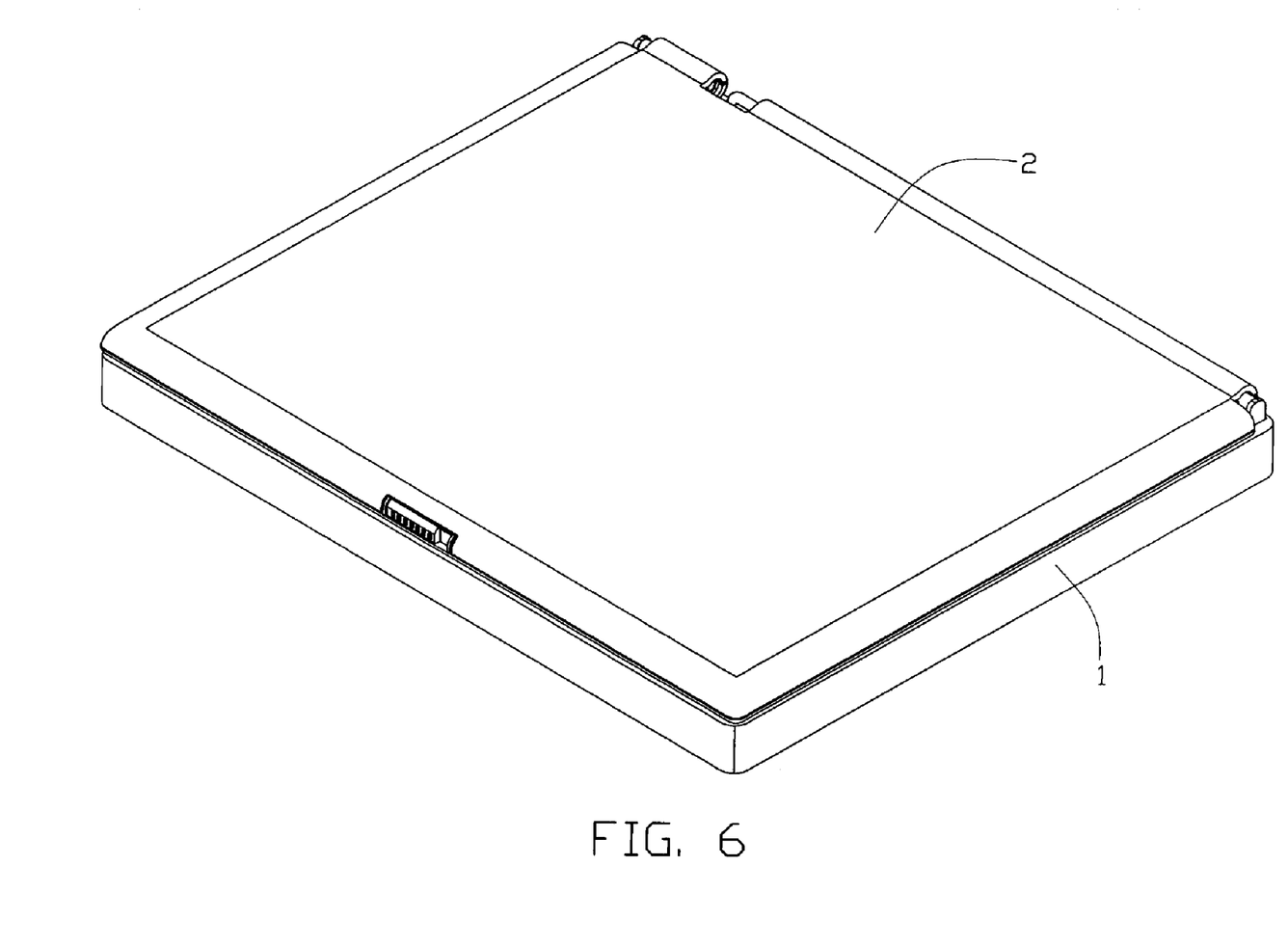
FIG. 6 is an assembled view of FIG. 1.

As shown in FIGS. 3 to 5, in assembly, the positioning pins 533 of the positioning members 50 are inserted in the locking bridges 333 of the framework 30 respectively. A plurality of screws 40 extends through the first through holes 511 of the positioning members 50 and then engages in the first threaded holes 313 of the framework 30 respectively, thus the positioning members 50 are attached to the inner surface of the framework 30 adjacent the opening thereof. The LCD panel 70 is received in the space made of the framework 30 and the positioning members 50. A plurality of screws 60 extends through the second through holes 531 of the positioning members 50 and then engages in the second threaded holes 711 of the LCD panel 70 respectively, thus the LCD panel 70 is attached to the positioning members 50 via the sides 71 thereof being respectively mounted to the positioning members 50, and exposed through the opening of the framework 30. The cover 90 covers the framework 30, the positioning members 50 and the LCD panel 70 are received between the framework 30 and the cover 90, thus the cover unit 2 is assembled. The cover unit 2 is pivotally connected to the rear portion of the base unit 1. FIG. 6 shows an assembled view of the portable computer. An outer surface of the framework 30 directly faces the base unit 1 when the cover unit 2 is rotated closed.

The positioning members 50 and the LCD panel 70 engage to the framework 30, thus the cover 90 is taken out to be replaced directly. To replace the LCD panel 70, the cover 90 is taken out, and the screws 60 are unscrewed, thus the LCD panel 70 is removed from the cover unit 2 freely.

The structures engaging the cover 90 to the framework 30 and the structures connecting the cover unit 2 to the base unit 1 are similar to the existing technology, and the present embodiment do not to describe them in details.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A portable computer comprising:
    a base unit; and
    a cover unit pivotally connected to a rear portion of the base unit, wherein the cover unit comprises a framework on an outside of the cover unit having an outer surface directly facing the base unit when the cover unit is rotated closed, a pair of positioning members attached to an inner surface of the framework, a replaceable Liquid Crystal Display (LCD) panel having two sides respectively mounted to the positioning members, and a cover detachably engaging to the framework, an opening is defined in the framework for exposing the LCD panel.

2. The portable computer as claimed in claim 1, wherein each of the positioning members comprises a positioning pin, and the framework comprises a pair of locking bridges for receiving the positioning pins of the positioning members respectively.

3. The portable computer as claimed in claim 2, wherein the framework comprises a plurality of protruding posts, each of the protruding posts forms a first threaded hole, a plurality of first through holes is defined in each of the positioning members, and a plurality of screws extends through the first through holes of the positioning members and engages in the first threaded holes of protruding posts of the framework respectively.

4. The portable computer as claimed in claim 3, wherein each of the positioning members defines a plurality of second through holes, a plurality of second threaded holes is defined in the two sides of the LCD panel, and a plurality of screws extends through the second through holes of the positioning members and engages in the second threaded holes of the LCD panel respectively.

5. The portable computer as claimed in claim 4, wherein each of the positioning members is L-shaped.

6. The portable computer as claimed in claim 5, wherein each of the positioning members comprises a positioning tab and a main body, the positioning pin protrudes from an end of the main body, the first through holes are defined in the positioning tab, and the second through holes are defined in the main body of the positioning member.

7. A method for assembling a portable computer, the method comprising the steps of:
    a) providing a framework with an opening defined therein and a pair of positioning members, and attaching the positioning members to an inner surface of the framework;
    b) providing an LCD panel having two sides, and attaching the LCD panel to the positioning members via the sides thereof being respectively mounted to the positioning members, thus the LCD panel is exposed through the opening of the framework;
    c) providing a cover, engaging the cover to the framework for enclosing the positioning members and the LCD panel, thus a cover unit is assembled with the framework on an outside of the cover unit; and
    d) providing a base unit, and pivotally connecting the cover unit to the base unit to allow the base unit directly facing the opening of the framework when the cover unit is rotated closed, thus the portable computer is assembled.

8. The method as claimed in claim 7, wherein in step a, each of the positioning members comprises a positioning pin, and the framework comprises a pair of locking bridges for receiving the positioning pins of the positioning members respectively.

9. The method as claimed in claim 8, wherein the framework comprises a plurality of protruding posts, each of the protruding posts forms a first threaded hole, a plurality of first through holes is defined in each of the positioning members, and a plurality of screws extends through the first through holes of the positioning members and engages in the first threaded holes of protruding posts of the framework respectively.

10. The method as claimed in claim 9, wherein in step b, each of the positioning members defines a plurality of second through holes, a plurality of second threaded holes is defined in the two sides of the LCD panel, and a plurality of screws extends through the second through holes of the positioning members and engages in the second threaded holes of the LCD panel respectively.

11. The method as claimed in claim 10, wherein each of the positioning members is L-shaped.

12. The method as claimed in claim 11, wherein each of the positioning members comprises a positioning tab and a main body, the positioning pin protrudes from an end of the main body, the first through holes are defined in the positioning tab, and the second through holes are defined in the main body of the positioning member.

13. The method as claimed in claim 7, wherein the cover covers the framework detachably, the positioning members and the LCD panel are received between the framework and the cover.

14. A portable computer comprising:
    a base unit; and
    a cover unit comprising a framework on an outside of the cover unit having an outer surface directly facing the base unit when the cover unit is rotated closed, a pair of positioning members attached to an inner surface of the framework, a replaceable Liquid Crystal Display (LCD) panel secured to the positioning members, and a cover detachably mounted to the framework for enclosing the LCD panel and the positioning members, and the cover unit being pivotally connected to the base unit via the positioning members being pivotably secured to the base unit by means of pivoting shaft structures.

15. The portable computer as claimed in claim 14, wherein each of the positioning members comprises a main body abutting one corresponding side of the LCD panel, and a plurality of through holes is defined in the main body for a plurality of screws extending through the through holes of the main body and being secured to said side of the LCD panel.

16. The portable computer as claimed in claim 15, wherein a positioning tab and a positioning pin are respectively formed at two ends of the main body of each of the positioning members, a pair of locking bridges is formed at the inner surface of the framework, and the positioning members are mounted to the inner surface of the framework via the positioning pins being respectively inserted in the locking bridges and the positioning tabs being fixed to the inner surface of the framework by a plurality of screws.

17. The portable computer as claimed in claim 16, wherein each of the positioning members has an L-shaped profile.

18. The portable computer as claimed in claim 17, wherein the positioning tab of each of the positioning members is perpendicularly formed from one end of the main body thereof.

* * * * *